United States Patent [19]
Swart

[11] Patent Number: 4,804,859
[45] Date of Patent: Feb. 14, 1989

[54] TRIGGER CIRCUIT FOR A SAFETY SYSTEM
[75] Inventor: Marten Swart, Obertraubling, Fed. Rep. of Germany
[73] Assignee: Siemens Aktiengesellschaft, Berlin and Munich, Fed. Rep. of Germany
[21] Appl. No.: 167,130
[22] Filed: Mar. 11, 1988
[30] Foreign Application Priority Data
Mar. 26, 1987 [DE] Fed. Rep. of Germany ....... 3709894
[51] Int. Cl.⁴ .............................................. B60R 21/10
[52] U.S. Cl. .............................. 307/105 B; 307/10 R; 340/52 E; 340/52 H; 180/270; 280/735
[58] Field of Search ................. 307/10 R, 105 B, 116; 340/52 R, 52 E, 52 H; 180/268, 270, 271, 272, 273, 282, 283, 274, 287; 280/734, 735, 736

[56]  References Cited
U.S. PATENT DOCUMENTS

| 3,668,627 | 6/1972 | Brainerd | 340/52 H |
|---|---|---|---|
| 3,886,516 | 5/1975 | Itoh et al. | 307/105 B X |
| 3,898,473 | 8/1975 | Ueda et al. | 307/105 B |
| 3,902,074 | 8/1975 | Uota | 180/270 X |
| 3,904,884 | 9/1975 | Uota | 307/105 B |
| 4,166,641 | 9/1979 | Okada et al. | |
| 4,243,971 | 1/1981 | Suchowerskyi et al. | 340/52 H |
| 4,346,913 | 8/1982 | Schrauf et al. | 280/735 |
| 4,620,721 | 11/1986 | Scholz et al. | |

FOREIGN PATENT DOCUMENTS 2005887 10/1977 United Kingdom .

Primary Examiner—William M. Shoop, Jr.
Assistant Examiner—Paul Ip
Attorney, Agent, or Firm—Hill, Van Santen, Steadman & Simpson

[57]  ABSTRACT

A response step switch for a motor vehicle airbag system has switch contacts driven by a delay sensor dependent on two response cases. Dependent on the position of a status switch, a logic module selects an electronic selection switch for enabling the triggering of the airbag via one of the switch contacts. The electronic selection switch is not driven until one of the response cases occurs, whereby the control energy comes from an energy source that also supplies the ignition energy for triggering.

3 Claims, 2 Drawing Sheets

//4,804,859//

TRIGGER CIRCUIT FOR A SAFETY SYSTEM

CROSS REFERENCE TO RELATED APPLICATION

This application is related to application Ser. No. 169,051, filed Mar. 16, 1988.

BACKGROUND OF THE INVENTION

1. Field of the Invention

The present invention relates to a trigger circuit for a safety system which comprises an energy source for at least one trigger in a branch circuit, at least one response stepping switch which is driven into a first switch position or a second switch position depending on two delay values that are assigned to first and second conditions, and at least one selection switch which, dependent on the switch position of a status switch, connects the trigger to one of the switch contacts of the response stepping switch.

2. Description of the Prior Art

In a motor vehicle air bag system, for example, comprising a delay sensor that drives a response switch when a defined delay value is reached is a safety system of the type mentioned above. A motor vehicle is usually additionally equipped with safety belts. When an accident happens at low speed, the safety belt that is worn is normally adequate by itself to protect the occupants. Triggering the air bag is only needed given an accident at high speed. Such a safety system is disclosed in the German application No. 34 13 768, fully incorporated herein by this reference.

The response switch is thereby expanded to form a response step switch. Given an impact at a lower speed and, consequently, a smaller delay value, this response step switch is driven to a first switch contact position by a delay sensor (response case 1) and is driven to a second switch contact position given a greater delay value (response case 2).

The position of a status switch, a belt switch here, indicates whether the safety belt is attached. In accordance therewith, a selection switch is driven that connects the trigger for the air bag either to the first or to the second switch contact of the response step switch.

When the belt switch is closed, i.e. the belt is being worn, the selection switch is condition such that a triggering of the air bag only occurs in the response case 2.

When, by contrast, the belt switch is open, i.e. the belt is not being worn, the selection switch is conditioned such that a triggering occurs in the response case 1 and, therefore, the air bag assumes the protectie function of the belt that is not being worn.

In accordance with the art heretofore known, the control of the selection switch occurs by way of relays. For a proper operation of the trigger circuit, the switch position of the selection switch defined by the belt switch must be preserved in every case. A bistable relay suitable for this purpose, however, is not yet available due to the required impact resistance of 100 g and vibration resistance 5 g given a frequency of 20–30 Hz. These requirements are only met by relays that are held in their switch positions by continuously-present excitation energy. This, however, means a considerably, permanent energy consumption in the operating readiness of the trigger circuit.

A further problem is that a destruction or separation of the vehicle battery supplying the execution energy can occur in accidents before the triggering of the air bag. The switch position of the selection switch is therefore left to chance.

SUMMARY OF THE INVENTION

The primary object of the present invention is the provision of the trigger circuits such that no energy is used in stand-by operation. Furthermore, all functions must remain guaranteed even when the energy supply of the motor vehicle has failed.

The above object is achieved, according to the present invention, in a trigger circuit for a safety system, comprising an energy source for at least one trigger in a trigger branch, that contains at least one response step switch that, dependent on two delay values there assigned to a first and to a second response case, is driven to a first or to a second switch contact, that comprises at least one selection switch that, dependent on the switch position of a status switch, connects the trigger to one of the switch contacts of the response step switch, and which is particularly characterized in that the selection switch is at least one electronic switch, and that a logic module is provided which, given a response case, is connected to the energy source by way of one of the switch contacts of the response step switch and drives the selection switch.

According to a particular feature of the invention, a respective plurality of status switches and selection switches are provided in the safety system.

According to another feature of the invention, the selection switch is a VMOS transistor.

The selection switch is thereby replaced by one or more electronic switches. The resistance to impact and to vibration that is required is always established in the case of such semiconductor switches. Furthermore, the operational reliability is greater than in the case of a relay and periodically repeated, frequency switching tests do not represent a problem.

Since, on the one hand, a driven semiconductor switch also continuously uses control energy but, on the other hand, its switcing time is extremely short, it is further provided in accordance with the invention that the semiconductor switch not be driven until one of the response cases of the response step switch. No energy whatsoever is thereby utilized in stand-by operation. A logic module which assumes the drive of the selection switch receives the control energy required for that purpose via the response step switch, receiving the same from an energy source that supplies the ignition energy for the trigger independently of the normal energy supply.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENT

Figure 1:
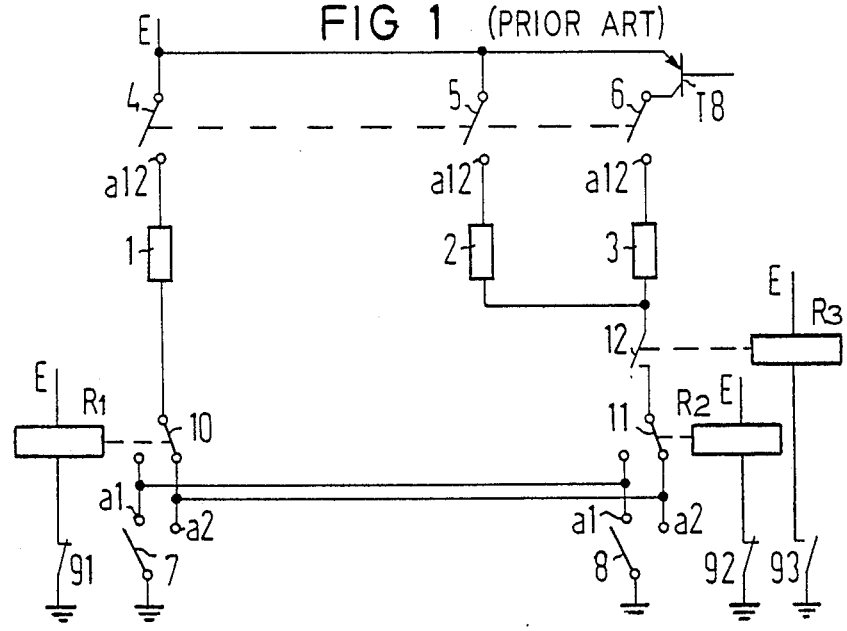
FIG. 1 is a basic circuit diagram of a trigger circuit for an airbag system as known in the art.

The trigger circuit illustrated in FIG. 1 is designed for a driver and for a front seat passenger air bag. An ignition wafer 1 is thereby the trigger for the driver airbag. The front seat passenger airbag must be larger than the driver airbag because of the lack of the steering wheel and is therefore triggered in two stages. Accordingly, it has two ignition wafers 2 and 3, whereby the second ignition wafer 3 is triggered with a delay.

An electrical energy source E (not shown in detail) is connected to the ignition wafers 1, 2 and 3 by way of three response step switches 4, 5 and 6 each having a switch contact a12. A delay transistor T8 is additionally connected between the energy source E and the response step switch 6 in order to delay the triggering of the ignition wafer 3. The response step switches 4, 5 and 6 are mechanically connected to one another, this being indicated by a broken line, and are closed by a delay sensor (not shown) as soon as the delay value is equal to or greater than a first, lower limit value.

The ignition wafer 1 is further connected to a selection switch 10 which is constructed as a two-way switch. The two-way switch 10 connects the ignition wafter 1 to a switch contact a1 of a pair of response step switches 7 and 8 in one switch position and connects it to a switch contact a2 of the response step switches 7 and 8 in the other switch position. The response step switches 7 and 8 respectively connect the switch contacts a1 and a2 to ground.

The ignition wafers 2 and 3 are interconnected and are applied to a selection switch 12 that is designed as an on-off switch. The selection switch 12 connects the ignition wafers 2 and 3 to a further selection switch 11 that is designed as a two way switch. The selection switch 11 is then connected to the switch contact a1 and a2 of the response step switches 7 and 8 as already set forth with reference to the selection switch 10.

The response step switches 7 and 8 are each actuated by a delay sensor (not shown). In the response case 1, the delay value lies between the first and a second, higher limit value, which drives it to the respective switch contact a1 and, in response case 2, the delay value is equal to or greater than the second limit value, so that it is driven to the switch contact a2.

A first condition for triggering the ignition wafers 1, 2 and 3 and, therefore, for triggering the two airbags is met when the coupled response step switches 4, 5 and 6 close and when one of the two response step switches 7 and 8 connected parallel to one another additionally switch to one of the two switch contacts a1 or a2. The respective position of the selection switches 10, 11 and 12 determines whether a triggering already occurs in the response case 1, i.e. by way of the switch contacts a1 or does not occur until the response case 2 by way of the switch contacts a2.

The selection switch 10 is controlled by a relay R1 whose excitation coil is switched on and off by way of a driver seat-belt switch 91. When the belt is worn, the driver seat-belt switch 91 is closed and the relay drives the selection switch 10 into the position illustrated in FIG. 1. A triggering of the ignition wafer 1 can therefore occur only by way of the switch contact a2. When the driver's seat belt is not being worn, then the driver seat-belt switch 91 is open and the relay drives the selection switch 10 into the position that is assigned to the switch contact a1. As a result thereof, ignition of the ignition wafer 1 occurs by way of the switch contact a1, i.e. already in the response case 1.

As in the case of the driver airbag, the selection switch 11 for the front seat passenger airbag is controlled by a relay R2 whose excitation coil is switched on and off by a front seat passenger seat-belt switch 92. The function is the same as the function set forth above with respect to the driver airbag.

The further selection switch 12 is also provided in the circuit of the front seat passenger airbag, this further selection switch 12 being controlled by a relay R3 whose excitation coil is switched on and off by a seat switch 93. When the seat is not occupied, the seat switch 93 is open, and, as a further status switch, has the job of preventing a triggering of the front seat passenger airbag when the seat is not occupied. Given an occupied seat, the seat switch 93 is closed, whereby the relay closed the selection switch 12 and, therefore, an air bag triggering can occur.

Figure 2:
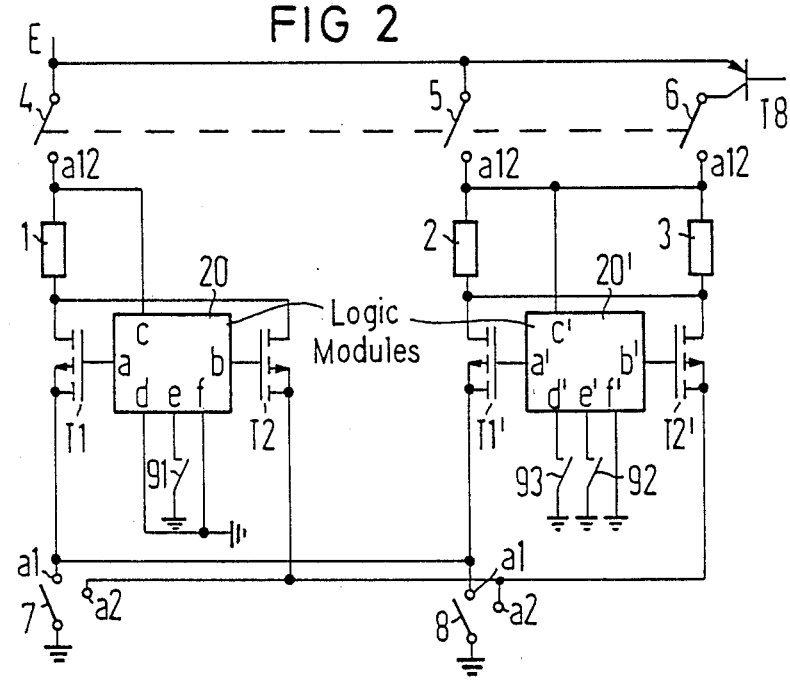
FIG. 2 is a basic circuit diagram of a trigger circuit constructed in accordance with the present invention.

FIG. 2 illustrates the fundamental circuit diagram of a trigger circuit constructed in accordance with the present invention. Analogous to FIG. 1, the energy source E is connected to the ignition wafers 1, 2 and 3 by way of the responsive step switches 4, 5 and 6. The ignition wafer 1 is further connected to the drain terminal of a VMOS transistor T1 and the drain terminal of a VMOS transistor T2. The ignition wafers 2 and 3 are connected in the same manner to the drain terminals of a pair of VMOS transistors T1' and T2'. Respective source terminals of the VMOS transistors T1 and T2 or, respectively, T1' and T2' are, in turn, connected to the switch contact a1 and a2 of the response step switches 7 and 8 like the change-over contacts of the selection switches 10 and 11 in FIG. 1.

The VMOS transistors T1 and T2 or, respectiely, T1' and T2' assume the function of the selection switches 10, 11 and 12 in FIG. 1.

The drive of the VMOS transistors T1 or T2 or, respectively, T1' or T2' is assumed by a logic module 20 or, respectively, 20' that drives the gate of the VMOS transistor T1 or, respectively, T1' via an output a or, respectively, a' and drives the gate of the VMOS transistor T2 or, respectively, T2' via an output b or, respectively b'.

The logic modules 20 and 20' have inputs c, d, e and f and, respectively, c', d', e' and f'. The input c of the logic module 20 is applied to the supply voltage side terminal of the ignition wafer 1. The input c' of the logic module 20' is connected to the terminals of the ignition wafers 2 and 3 at their supply voltage sides. The input f or, respectively, f' of the logic module 20 and the logic module 20' is respectively connected to ground. The input d of the logic module 20 is likewise connected to ground. The input e of the logic module 20 is connected to ground by way of the driver seat-belt switch 91. The inputs d' and e' of the logic module 20' are accordingly connected to ground by way of the front seat passenger seat-belt switch 92 and by way of the seat switch 93, respectively.

Figure 3:
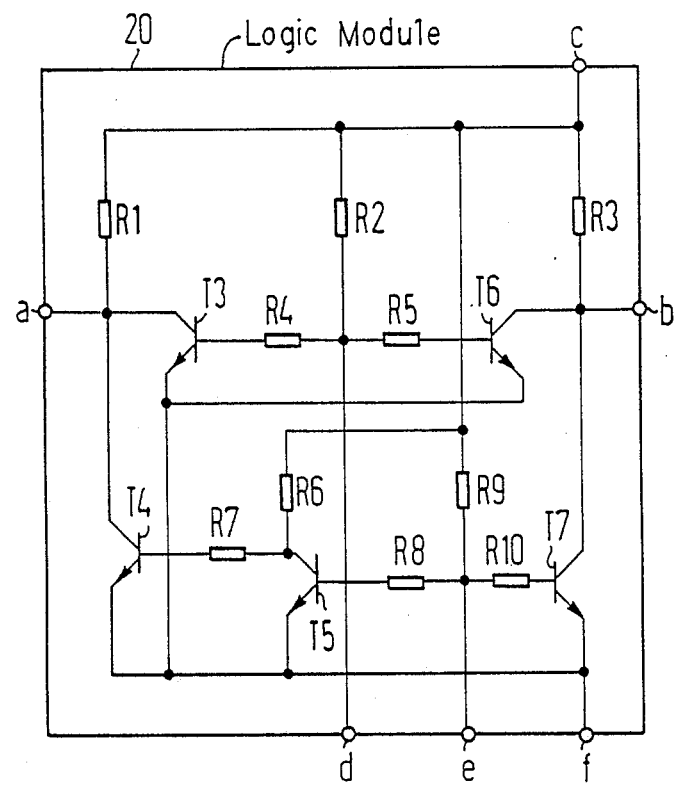
FIG. 3 is a circuit diagram of a logic module as may be employed in practicing the present invention.

FIG. 3 illustrates an exemplary embodiment of a logic module 20. The structure and operation also correspond to that of the logic module 20'.

The logic module 20 contains a switching network composed of a plurality of transistors T3-T7 and a plurality of resistors R1-R10. The following line connections exist preceding from the inputs/outputs a, b, c, d, e, f:

the input a is connected to the other terminal of the resistor R1 and to the collectors of the transistors T3 and T4;

the input d is connected to the other terminal of the resistor R2 and to a respective terminal of the resistors R4 and R5;

the input e is connected to the other terminal of the resistor R9 and to one terminal each of the resistors R8 and R10;

the input f is connected to the emitters of the transistors T3, T4, T5, T6 and T7; and the output b is connected to the other terminal of the resistor R3 and to the collectors of the transistors T6 and T7.

The following line connections are also provided within the circuit, to wit:

the base of the transistor T3 is connected to the other terminal of the resistor R4;

the base of the transistor T6 is connected to the other terminal of the resistor R5;

the base of the transistor T5 is connected to the other terminal of the resistor R8;

the base of the transistor T7 is connected to the other terminal of the resistor R10;

the collector of the transistor T5 is connected to the other terminal of the resistor R6 and to a terminal of the resistor R7; and the base of the transistor T4 is connected to the other terminal of the resistor R7.

The task of the logic module 20 is to through-connect or, respectively, inhibit the VMOS transistors T1 and T2 by way of the outputs a and b dependent on the switch positions of the status switches at the inputs d and e.

The possible cases shall be presented below with reference to the logic module 20' according to FIG. 2. In response to cases 1 and 2, the response switches 5 and 6 are closed by way of the switch contact a12 so that the logic module 20' is supplied with a supply voltage by way of the input c'. The seat switch 93 is closed when the seat is occupied, but is otherwise open. Accordingly, the front seat passenger seat-belt switch 92 is closed when the belt is being worn, but is otherwise open.

Cases 1 and 2

The seat is not occupied and, consequently, the seat switch 93 is open.

By way of the input c', therefore, a current flows through the resistor R2 and the resistor R5 to the base of the transistor T6 and through the resistors R2 and R4 to the base of the transistor T3. The collector-emitter paths of the transistors T3 and T6 are accordingly through-connected. The current through the resistor R1 and through the resistor R3 to the respective gate of the transistor T1' and the transistor T2' is consequently converted to ground by way of the transistors T3 and T6 way of the input f'. The transistor T1' and the transistor T2' therefore remain inhibited in each case regardless of the position of the front seat passenger seat-belt switch 92.

Cases 3 and 4

The seat is occupied and, accordingly, the seat switch 93 is closed.

The current flowing by way of the resistor R2 for driving the transistors T3 and T6 is therefore conducted to ground by way of the closed seat switch 93 and the input d'. The collector-emitter paths of the transistors T3 and T6 therefore remain inhibited. The drive of the transistors T1' and T2' is then dependent on the position of the front seat passenger seat-belt switch 92.

Case 3

The seat switch 93 is closed and the belt is not being worn, i.e. the front seat passenger seat-belt switch 92 is open.

A current therefore flows through the resistors R9 and R8 to the base of the transistor T5 and through the resistor R9 and the resistor R10 to the base of the transistor T7. The collector-emitter paths of the transistors T5 and T7 are therefore through-connected. A current through the resistor R6 and the resistor R7 to the base of the transistor T4 does not arise since this is diverted to ground by way of the resistor R6 and the collector-emitter path of the transistor T5. The collector-emitter path of the transistor T4 remains inhibited. A current through the resistor R1 accordingly proceeds to the gate of the transistor T1' and drives this transistor. The transistor T2', by contrast, remains inhibited, since the current to the gate by way of the resistor R3 is diverted to ground by way of the collector-emitter path of the transistor T7.

Case 4

The seat switch 93 is closed and the belt is being worn, i.e. the front seat passenger seat-belt switch 92 is also closed.

The collector-emitter paths of the transistors T5 and T7 therefore remain inhibited since the current arriving through the resistor R9 to the bases of these transistors by way of the resistors R8 and R10 is diverted to ground by way of the front seat passenger seat-belt switch 92. The collector-emitter path of the transistor T4, by contrast, is driven since a current through the resistor R6 and through the resistor R7 can now flow to the base of the transistor T4. The gate current of the transistor T1' is diverted to ground and the transistor T1' remains inhibited. By contrast, the transistor T2' is through-connected since its gate current can now flow through the resistor R3.

For this purpose of illustration, all possible cases are set forth below in the following table.

| Case | Seat Switch 93 | Passenger Seat-Belt Switch 92 | Transistor T1' | Transistor T2' |
| --- | --- | --- | --- | --- |
| 1 | Open | Open | Inhibited | Inhibited |
| 2 | Open | Closed | Inhibited | Inhibited |
| 3 | Closed | Open | Conductive | Inhibited |
| 4 | Closed | Closed | Inhibited | Conductive |

Accordingly deriving for the triggering of the ignition wafers 2, 3 of FIG. 2 is:

When the seat is not occupied, in accordance with the cases 1 and 2, the VMOS transistors T1' and T2' remain inhibited and the ignition tables 2 and 3 cannot ignite;

When by contrast the seat is occupied, then, in accordance with the cases 3 and 4, the triggering depends on whether the belt is being worn. When the belt is not being worn, as in the case 3, the transistor T1' is conductive and the transistor T2' remains inhibited. The triggering of the ignition wafers 2 and 3 therefore already occurs when the response step switches 5 and 6 and one of the response step switches 7 or 8 is switched to the switch contact a1; and When, by contrast, the belt is being worn, as in the case 4, the transistor T2' become conductive and the transistor T1' remains inhibited. The triggering can therefore only occur by way of the switch contact a2 of the response step switches 7, 8.

The same is basically true for the triggering of the ignition wafer 1 in FIG. 2. The seat switch 93 is thereby considered to be omitted, since the driver's seat is always occupied. The input d of the logic module 20 is accordingly connected to ground, whereby a continuously-closed seat switch 93 is simulated.

The exemplary embodiment of the logic module 20 or, respectively, the logic module 20' according to FIG. 3 represents only one possible embodiment of the invention. Such a logic module 20 or 20' can be just as easily realized by some other switch arrangement or, respectively, by some other electrical or electronic components. This task could likewise be assumed by an appropriately-connected microcomputer.

The invention can also be arbitrarily expanded, for example, for motor vehicles in which additional airbags are also provided for rear seat passengers. Each individually triggerable airbag is then provided with a logic module 20 or 20' and with the VMOS transistors T1, T2, or respectively, T1', T2°.

The integration of further safety devices into the safety system is likewise possible. This, for example, could be an additional ignition wafer 1, 2, 3 for a belt tenser that is to be triggered dependent on a status switch and in one of the response cases. In this case, a further VMOS transistor is merely connected to the trigger branch of the belt tenser, this further VMOS transistor being driven via a further input of the logic module 20 or the logic module 20'. In case the logic operation that controls the triggering is not yet present in the switching network of the logic module 20 or the logic module 20', the same can be arbitrarily expanded.

Although I have described my invention by reference to a particular illustrative embodiment thereof, with reference to various further embodiments, many other changes and modifications may become apparent to those skilled in the art without departing from the spirit and scope of the invention. I therefore intend to include within the patent warranted hereon all such changes and modifications as may reasonably and properly be included within the scope of my contribution to the art.

I claim:

1. In a trigger circuit for a safety system of the type which comprises an energy source for at least one trigger located in a trigger branch, at least one response step switch which is driven to a first switch contact or to a second switch contact dependent on two delay values which are assigned to a first response case and to a second response case, respectively, and at least one selection switch which, dependent on the switch position of a status switch connected thereto, connects the trigger to one of the switch contacts of the response step switch, the improvement wherein:

the selection switch comprises at least one electronic switch connected to the trigger; and a logic module is connected to the energy source by way of the switch contacts of the response step switch and is operable to drive the selection switch for controlling operation of the trigger.

2. The improved trigger circuit of claim 1, and further comprising:

a plurality of said status switches and a plurality of selection switches connected to the plurality of status switches and to the trigger for controlling operation of the trigger.

3. The improved trigger circuit of claim 1, wherein:
the selection switch comprises a VMOS transistor.

* * * * *